Figure 1:
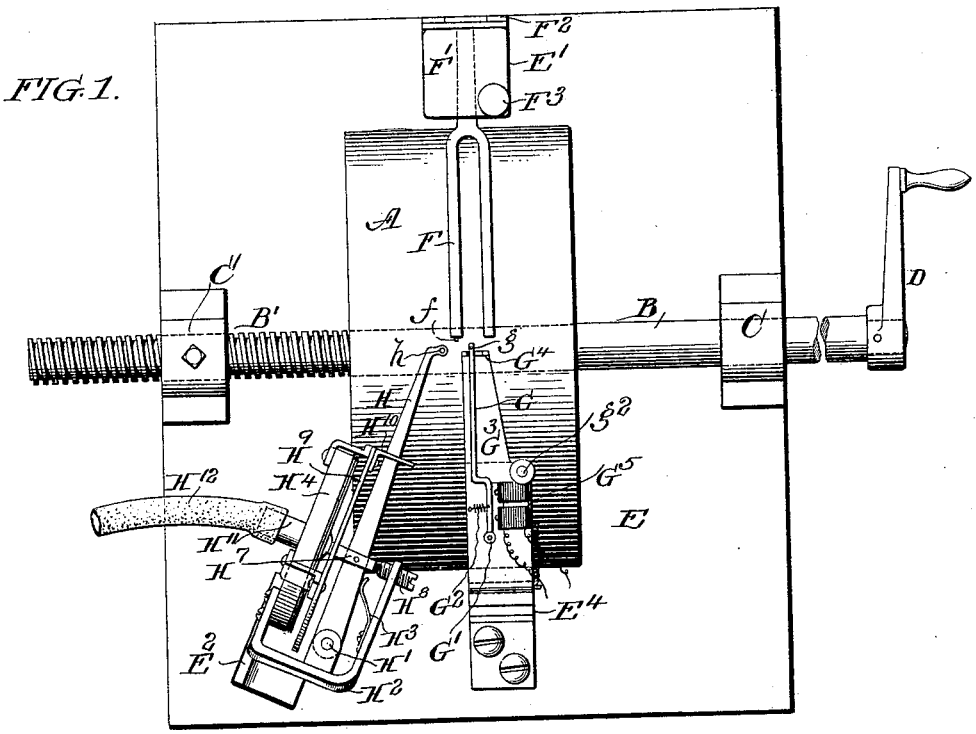

(No Model.) 2 Sheets—Sheet 1.

B. C. BATCHELLER.
APPARATUS FOR LOCATING OBSTRUCTIONS IN TUBES.

No. 602,422. Patented Apr. 19, 1898.

Witnesses. Inventor.

(No Model.) 2 Sheets—Sheet 2.
B. C. BATCHELLER.
APPARATUS FOR LOCATING OBSTRUCTIONS IN TUBES.
No. 602,422. Patented Apr. 19, 1898.
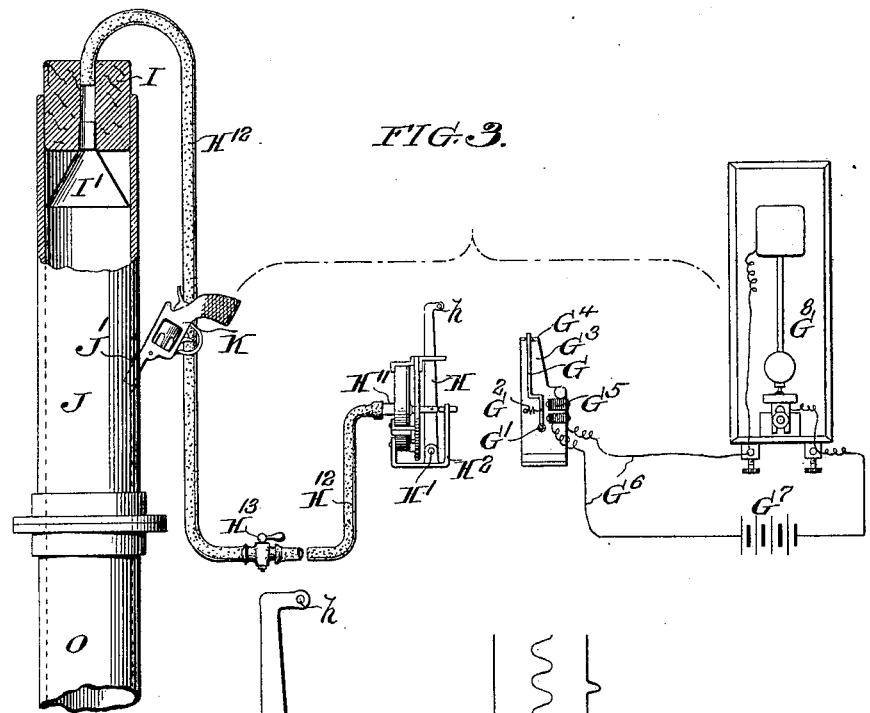
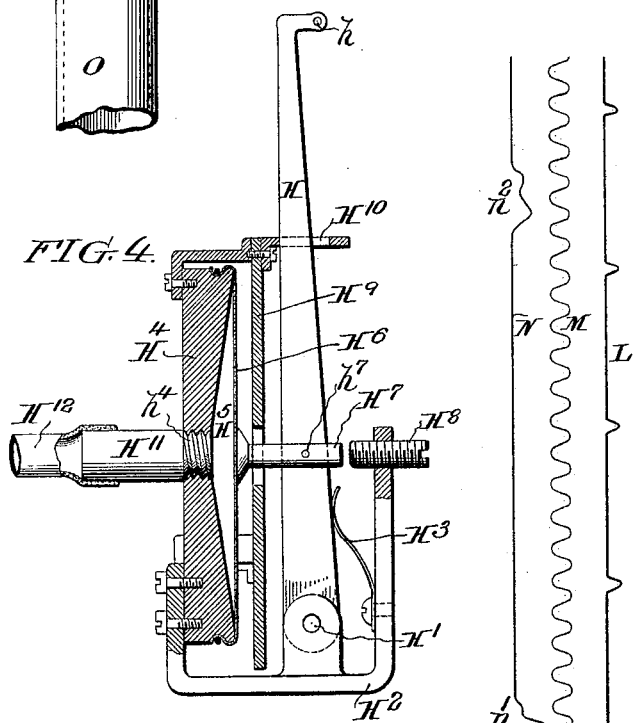
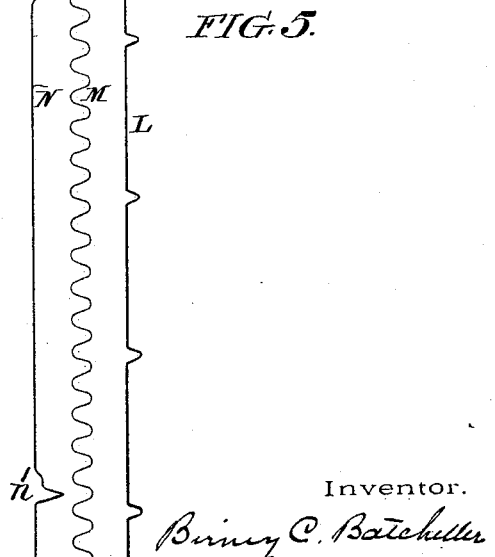
Witnesses. Inventor.
Birney C. Batcheller
Attorney.

UNITED STATES PATENT OFFICE.

BIRNEY C. BATCHELLER, OF PHILADELPHIA, PENNSYLVANIA.

APPARATUS FOR LOCATING OBSTRUCTIONS IN TUBES.

SPECIFICATION forming part of Letters Patent No. 602,422, dated April 19, 1898.

Application filed September 28, 1897. Serial No. 653,340. (No model.)

*To all whom it may concern:*

Be it known that I, BIRNEY C. BATCHELLER, a citizen of the United States of America, residing in the city and county of Philadelphia, in the State of Pennsylvania, have invented a certain new and useful Improvement in Methods of and Apparatus for Locating Obstructions in Tubes, of which the following is a true and exact description, reference being had to the accompanying drawings, which form a part thereof.

My invention relates to a new method for locating obstructions in pneumatic or other tube systems and to improved mechanism especially adapted for carrying my mechanism into practical use.

It has heretofore been attempted with varying degrees of success to locate obstructions in long tubes by ascertaining and recording the lapse of time intervening between the creation of a sound impulse in the tube at a certain point and the reflection or echo of the said sound returning to the said point after being reflected from the obstruction in the tube. The velocity of the sound-wave being a known factor, it is easy to compute from the data thus obtained the distance of the obstruction from the point in the tube at which the test is made.

My invention is an improvement upon the method briefly described above; and in its main feature it consists in wholly or partly closing the connection from the tube to be tested to the sound and time recording apparatus at the time when the sound impulse is created in the tube and then fully and freely opening the said connection before the echo or reflection of the said sound returns to the point in the tube where the test is made, my purpose being to avoid an undue and disruptive shock to the recording apparatus, such as would be apt to occur if the recording apparatus was in full connection with the tube at the time the sound is made and at the same time to cause the weaker reflected sound to act directly and with full force upon the recording apparatus.

In carrying my invention into effect I have devised a connection between the tube and the recording apparatus of such a character or provided with such appliances that it may be partially or wholly closed when the impulse is created and freely and entirely open before the return of the echo or reflected sound-wave. Another useful and valuable feature of my invention consists in protecting the diaphragm, to which the sound-waves are communicated and through which they are transmitted to the recording mechanism, against undue and disruptive shock by placing in front of it a shield or protecting-plate, against which it is impelled in the event of its being exposed to a dangerous sound impulse and by means of which its outward movement to a disruptive point is prevented.

The nature of my improvements will be best understood as described in connection with the drawings, in which it is illustrated, and in which—

Figure 2:
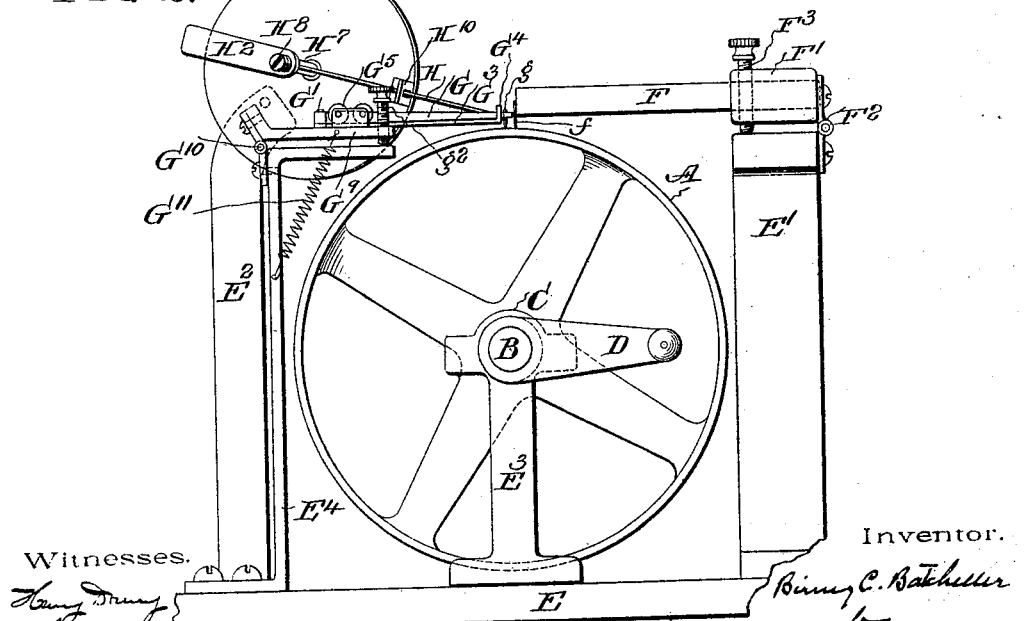

Figure 1 is a plan view of the recording apparatus; Fig. 2, a side elevation of the same; Fig. 3, a diagrammatic illustration of the various appliances making up the recording apparatus and connected therewith and all of the means for connecting the recording apparatus with the tube and for creating a sound impulse in the tube. Fig. 4 is an enlarged sectional view of the sound-recording diaphragm and its immediate connections, and Fig. 5 a diagrammatic illustration of the record made by the appliances shown when in operation.

A is a cylinder having a smooth surface, which in use is coated with lampblack or some other film upon which a light stylus will make a visible impression. This cylinder is secured to a shaft B, threaded at one end, as indicated at B', and resting in convenient bearings, as indicated at C and C', bearing C being threaded to engage the threaded portion of the shaft B.

D is a crank by which the shaft and cylinder can be turned, and obviously as they turn they are by the action of the screw B' longitudinally and gradually moved. While I have indicated a crank as a convenient device for rotating and moving the cylinder, it will of course be understood that any convenient driving apparatus may be substituted therefor. As shown, the cylinder is mounted on a base E, the bearings C and C' being supported on standards $E^3$, extending up from the side piece, and other standards, as indicated at E', $E^2$, and $E^4$, being provided as supports for the appliances hereinafter described.

F is a tuning-fork of known pitch, having a light stylus (indicated at $f$) attached to one of its prongs in position to rest lightly on the cylinder A. The tuning-fork, as shown, is attached to a block $F'$, hinged to the standard $E'$ at $F^2$, an adjusting-screw $F^3$ serving to adjust the pressure with which the stylus $f$ will rest against the cylinder A. In practice I may state I have used a tuning-fork giving the note "C" of the musical scale and having a known rate of five hundred and twelve single vibrations per second. The wave-line produced by the stylus produced by the said tuning-fork is diagrammatically illustrated at M in Fig. 5, each single vibration thus recorded measuring one five hundred and twelfth ($\frac{1}{512}$) of a second.

G is a light rod pivotally supported on a block $G^9$, hinged at $G^{10}$ to the standard $E^4$ and adjustable in height by means of the adjusting-screws $g^2$. An extension $G^2$, having a turned-up and slotted end $G^4$, serves to support the outer end of the light lever or rod G, to which is attached the stylus $g$, the said rod or lever being pivoted at $G'$ to the block $G^9$. A spring $G^2$, acting on the lever G, draws it away from an electromagnet, (indicated at $G^5$,) said electromagnet when energized overcoming the tension of the spring and drawing the lever G toward it. The energizing of the magnet is conveniently effected at definite time intervals, as indicated in Fig. 3, $G^6$ indicating circuit-wires in which is situated a battery $G^7$ and a pendulum or equivalent escapement (indicated at $G^8$) and by means of which the circuit is closed at definite time intervals. For instance, I have found it convenient to use a pendulum of such length that the circuit will be closed once in each half-second, and the record upon the cylinder A effected by the stylus $g$ will be of a character indicated at L in Fig. 5, such a record serving in connection with the tuning-fork record M to greatly facilitate the computation of the total time interval.

The sound-impulse-recording mechanism operates a light pivot-lever H, having at its end a stylus $h$. This lever, as shown, is pivoted to a frame $H^2$, supported on the standard $E^2$, the pivot being indicated at $H'$, a light spring $H^3$ acting to press the lever H in one direction, as shown in Figs. 1 and 4, and an adjusting-screw $H^8$ being provided as an abutment to prevent the movement of the lever H against the spring beyond a definite point. The lever is actuated by a connection $H^7$, connected also to a diaphragm $H^6$, which is secured to a block $H^4$, hollowed out to form a chamber $H^5$, into which opens a passage $h^4$, or rather a tubular connection $H^{11}$, screwing into the passage $h^4$. The tubular connection $H^{11}$ is in turn connected with the tube to be tested conveniently, as shown, by a flexible pipe $H^{12}$, opening through a block I, having a funnel-shaped internal opening $I'$, into a pipe-section J, which, as shown, is connected with the tube O to be tested and is formed with an opening $J'$, through which a pistol-barrel can be inserted, K, Fig. 3, indicating the pistol in position to be fired.

It will be understood that an important feature of my method and also of my apparatus is the provision of means whereby the tubular connection between the tube to be tested and the sound-recording apparatus can be partly closed. Any convenient device may be employed for this purpose and among them a cock $A^{13}$, Fig. 3, which is a ready and simple means of partly closing and quickly opening the flexible tube $H^{12}$.

In order to further protect the diaphragm $H^6$ against disruptive sound-waves, I employ a shield or protecting-plate $H^9$, placed in front of it at a distance which will permit of its normal vibration, but which in case of an impulse adapted to have a disruptive effect upon the diaphragm will arrest the motion of the diaphragm and prevent its being forced out beyond a safe limit.

The character of the record made by the stylus $h$ is indicated at N in Fig. 5, $n'$ indicating the record made at the time the pistol is fired and $n^2$ the record made on the return of the echoes or reflected wave.

The operation of my device will be readily understood from what has already been said. When a test is to be made, the time-recording apparatus is set in operation, as is also the cylinder A, with the effect of making a record, such as M, or preferably such as M and L. The operator then partially closes the cock $H^{13}$ and fires the pistol K into the pipe-section J, as a result of which a sound-wave is transmitted through the partially-closed connection to the diaphragm $H^6$ and by it through the mechanism described to the stylus $h$, which makes a record, as indicated at $n'$. The operator then fully opens the cock $H^{13}$, and upon the return of the echo or reflected sound, which is of course much weaker than the initial sound, its impulse passes freely through the connection to the sound-recording apparatus, the stylus $h$ making a record of the return of the sound, as indicated at $n^2$. The work of calculating the distance of the obstruction against which the sound has been reflected is then simply the coördinated records enabling the operator to ascertain within a very short distance the exact position of the obstruction.

Having now described my invention, what I claim as new, and desire to secure by Letters Patent, is—

1. The method of locating obstructions in tubes which consists in connecting the tube to be tested with an apparatus for recording time intervals and sound-waves created in the tube, making a loud noise, as by an explosion, in the part of the tube to which the recording apparatus is attached partly closing the connection from the tube to the recording apparatus prior to the making of said loud noise therein so as to avoid an undue strain on the recording apparatus and immediately opening said connection after the sound impulse is created in the tube so as to afford a free passage to the recording apparatus for the sound impulse reflected from the obstruction in the tube.

2. In an apparatus for locating obstructions in tubes—the combination with an apparatus for visually recording time intervals of means for coördinately recording sound-waves said means being connected with the tube to be tested as described and so that sound-waves created in said tube will be visually recorded, and means for wholly or partially interrupting the transmission of the sound-waves from the tube to the sound-recording device.

3. In an apparatus for locating obstructions in tubes consisting of a device for visually recording time intervals and means for coördinately recording sound impulses created in the tube to be tested, the combination of a tubular connection leading from the tube to be tested, a diaphragm open to sound impulses coming through said connection, a stylus actuated by said diaphragm to record the sound impulses and means for varying the opening through the tubular connection to the diaphragm.

4. In an apparatus for locating obstructions in tubes consisting of a device for visually recording time intervals and means for coördinately recording sound impulses created in the tube to be tested, the combination of a tubular connection leading from the tube to be tested, a diaphragm open to sound impulses coming through said connection, a stylus actuated by said diaphragm to record the sound impulses and a guard-plate situated in front of the diaphragm arranged to check its outward movement beyond a point of safety.

BIRNEY C. BATCHELLER.

Witnesses:
  CHAS. F. MYERS,
  D. STEWART.